(12) United States Patent
Sathish et al.

(10) Patent No.: US 8,731,284 B2
(45) Date of Patent: May 20, 2014

(54) METHOD AND SYSTEM FOR DETECTING IMAGE SPAM

(75) Inventors: Sriram J. Sathish, Karnataka (IN); Srinivasan H. Sengamedu, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 1116 days.

(21) Appl. No.: 12/339,740

(22) Filed: Dec. 19, 2008

(65) Prior Publication Data

US 2010/0158395 A1 Jun. 24, 2010

(51) Int. Cl.
*G06K 9/00* (2006.01)

(52) U.S. Cl.
USPC .......................... 382/165; 382/100

(58) Field of Classification Search
USPC .......................... 382/165, 164, 100
See application file for complete search history.

(56) References Cited

U.S. PATENT DOCUMENTS

| | | | | |
|---|---|---|---|---|
| 7,751,620 | B1* | 7/2010 | Cosoi | 382/168 |
| 2007/0201757 | A1* | 8/2007 | Madej et al. | 382/254 |
| 2008/0131005 | A1* | 6/2008 | Oliver | 382/229 |
| 2008/0131006 | A1* | 6/2008 | Oliver | 382/229 |
| 2008/0159632 | A1* | 7/2008 | Oliver et al. | 382/209 |
| 2009/0043853 | A1* | 2/2009 | Wei et al. | 709/206 |
| 2009/0100523 | A1* | 4/2009 | Harris | 726/26 |
| 2009/0110233 | A1* | 4/2009 | Lu et al. | 382/100 |
| 2009/0141985 | A1* | 6/2009 | Sheinin et al. | 382/202 |
| 2009/0220166 | A1* | 9/2009 | Choi et al. | 382/260 |
| 2009/0245635 | A1* | 10/2009 | Yehezkel et al. | 382/171 |
| 2010/0008569 | A1* | 1/2010 | Smirnov | 382/165 |
| 2010/0008579 | A1* | 1/2010 | Smirnov | 382/176 |

OTHER PUBLICATIONS

Biggio et al., Image Spam Filtering by Content Obscuring Detection, Dept. of Electrical and Electronic Eng., University of Cagliari, Aug. 2-3, 2007, 5 pages, CEAS 2007—Fourth Conference on Email and Anti-Span, Mountain View, California USA.

Wang et al., Filtering Image Spam with Near-Duplicate Detection, Computer Science Dept., Princeton University, 10 pages, Princeton, NJ 08540 USA.

* cited by examiner

*Primary Examiner* — Jingge Wu

(74) *Attorney, Agent, or Firm* — Berkeley Law & Technology Group, LLP

(57) ABSTRACT

Methods and systems are provided that may be used to determine a whether an image contains spam. In one particular embodiment, an image is transformed and spam is detected based on such a transformed image.

20 Claims, 9 Drawing Sheets

Our picks bring our readers BIG GAINS. Why?
Because we present well researched quality
companies backed by promotions which have the
ears of investors around the globe. When you
have GREAT PRODUCT and UNRIVALED PR you get
SUPER GAINS. This one is just what your
portfolio needs.

Trade Date        Tuesday November 21, 2006
Company           Ameross EC Inc
Symbol            ARSS
Current Price     $0.67
Projected Price   $2.20 (330% gain)
Current Market    Bullish ARSS which specializes in oil and gas and
precious metals exploration and drilling. This
is has an incredible Company in a BOOMING
sector. Look around you. Everything is run by
gas and oil.

A huge publicity campaign is beginning and will
be supported by some astounding press releases.
It's imperative to get in before the first big
announcement. Readers this is a big one. Don't
miss this chance.

WATCH ARSS TRADE STRONG ON TUESDAY NOVEMBER
21TH

FIG.6 600

●ur p cks br ng our readers BIG GAINS Why? Because we present well researched qual ty compan es backed by promot ons wh ch have the ears of nvestors around the globe When you have GREAT PR●●UCT and UNRIVALE● PR you get SUPER GAINS Th s one s just what your portfol o needs Trade ●ate    Tuesday November 21 2006
Company       Ameross EC Inc
Symbol        ARSS
Current Pr ce $0 67
Projected Pr ce $2 20 (330' ga n)
Current Market Bull sh ARSS wh ch Spec al zes n o l and gas and prec ous metals explorat on and dr ll ng Th s s has an ncred ble Company n a B●●MING sector Look around you Everyth ng s run by gas and o l A huge publ c ty campa gn s beg nn ng and w ll be supported by some astound ng press releases It s mperat ve to get n before the f rst b g announcement Readers th s s a b g one ●on t m ss th s ●hance

WATCH ARSS TRA●E STR●NG ●N TUES●AY N●VEMBER 21TH

FIG.7    700

Our p cks br ng our readers BIG GAINS Why? Because we present wel researched qual ty compan es backed by promot ons wh ch have the ears of nvestors around the globe When you have GREAT PRODUCT and UNRIVALED PR you get SUPER GAINS Th s one s just what your portfol o needs Trade Date        Tuesday November 21 2006
Company           Ameross EC Inc
Symbol            ARSS
Current Pr ce     $0 67
Projected Pr ce   $2 20 (330 ga n)
Current Market    Bull sh ARSS wh ch spec al zes n o l and gas and prec ous metals explorat on and dr ll ng Th s s has an ncred ble Company n a BOOMING sector Look around you Everyth ng is run by gas and o l A huge publ c ty campa gn s beg nn ng and w ll be supported by some astound ng press releases It s mperat ve to get n before the f rst b g announcement Readers th s s a b g one Don t m ss th s chance

WATCH ARSS TRADE STRONG ON TUESDAY NOVEMBER 21TH

FIG.8    800

Our picks bring our readers BIG GAINS Why?
Because we present well researched quality
companies backed by promotions which have the ears
of investors around the globe When you have GREAT
PRODUCT and UNRIVALED PR you get SUPER GAINS This
one is just what your portfolio needs Trade Date        Tuesday November 21 2006
Company           Ameross EC Inc
Symbol            ARSS
Current Price     $0 67
Projected Price   $2 20 (330 gain)
Current Market    Bullish ARSS which specializes in oil and gas and precious
metals exploration and drilling This s has an
incredible Company in a BOOMING sector Look
around you Everything is run by gas and oil A huge publicity campaign is beginning and will be
supported by some astounding press releases It's
imperative to get in before the first big
announcement Readers this is a big one Don t
miss this chance

WATCH ARSS TRADE STRONG ON TUESDAY NOVEMBER 21TH

FIG.9   900

METHOD AND SYSTEM FOR DETECTING IMAGE SPAM

BACKGROUND

1. Field

The subject matter disclosed herein relates to a method and system for detecting image spam.

2. Information

Spam is a type of abuse perpetrated on electronic messaging systems, such as e-mail systems, to indiscriminately send unsolicited bulk messages. Such bulk messages are often sent with the ultimate goal of defrauding unsuspecting users to a spammer's benefit. Because of its low costs and high returns, spamming has become a flourishing sub-legal Internet industry. For instance, according to conservative estimates, spam may comprise 80 to 85% of all e-mail in the world.

Spamming and the fight against it constitute two of the heaviest economic activities on the Internet. Some anti-spam techniques have been developed to counter or limit the number of spam messages that users receive. Anti-spam techniques often analyze text words used in a message and categorize a message as spam based on such text words. For example, the presence of certain words or regular expressions may indicate that a message constitutes spam. For example, if a message advertises a certain product, such as "herbal Viagra," such a message might be determined to be spam if it is known that spam messages often contain a "herbal Viagra" phrase within text of such a message.

There is currently an "arms race" between spammers and anti-spammers, e.g., the better the anti-spammers get at filtering out particular classes of spam messages, the more sophisticated the spammers become to deny the advantage the anti-spammers have by introducing new classes of spam messages that are, at least for a while, unidentifiable by the anti-spammers.

A new addition to the repertoire of spammers is image spam. Image spam is an obfuscating method in which text of the spam message is stored as an image and is displayed, for example, in e-mail of users. This may prevent current text-based spam filters from detecting and blocking image spam messages. Some early image spam filtering methods have worked by attempting to automatically segregate and recognize the text present in the spam images. However, spammers have circumvented such early filters by introducing noise of various forms into the spam image. Added noise tends to interfere heavily with automated character recognition engines in image spam filters, leading to many noisy image spam messages passing through image spam filters to end users.

BRIEF DESCRIPTION OF DRAWINGS

Non-limiting and non-exhaustive aspects are described with reference to the following figures, wherein like reference numerals refer to like parts throughout the various figures unless otherwise specified.

FIGS. 6-9 illustrate examples of binary images formed after implementing a conversion based on contiguous chunks according to one implementation.

DETAILED DESCRIPTION

Figure 1:
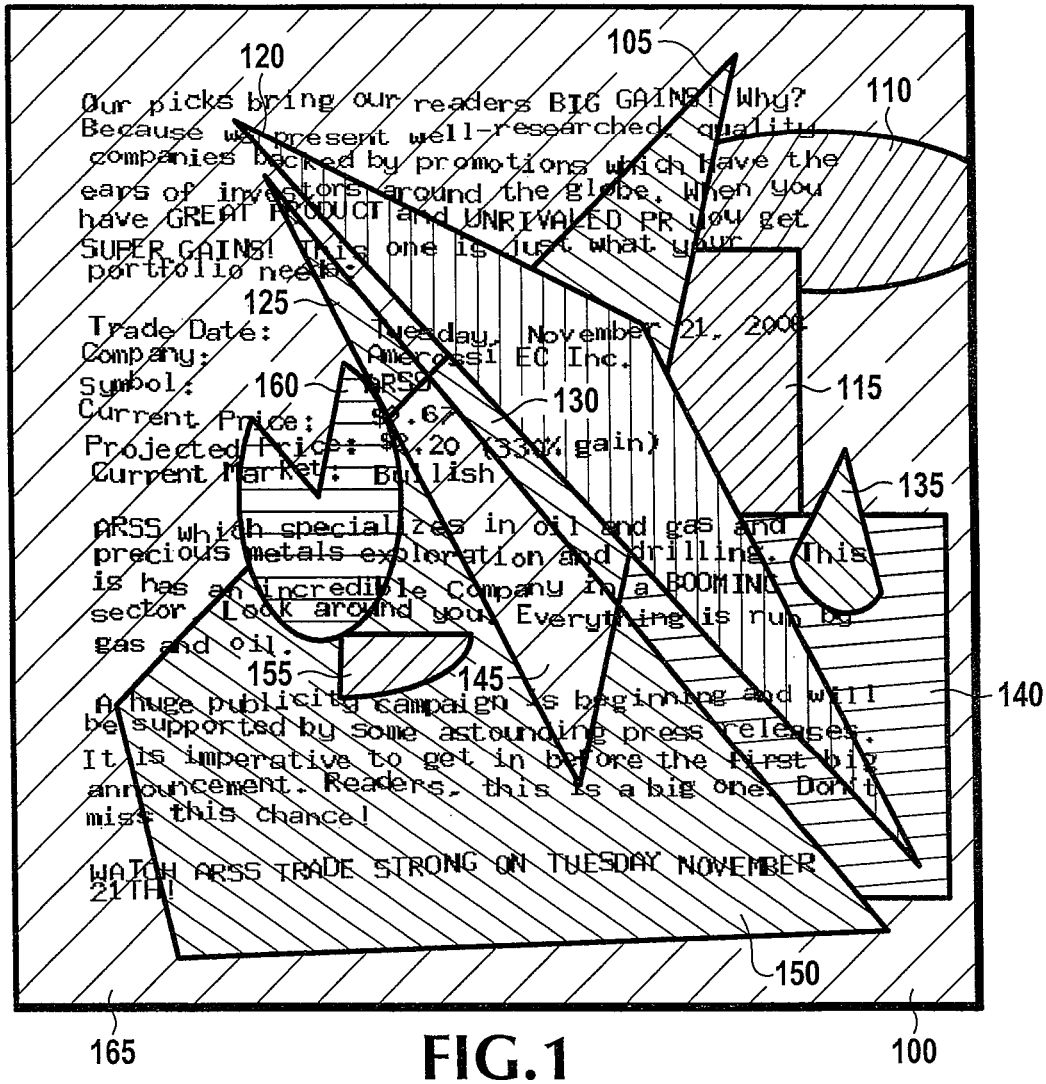
FIGS. 1-4 illustrate four spam images containing identical text messages.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "associating", "identifying", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

Some exemplary methods and systems are described herein that may be used to determine whether an image constitutes spam. "Spam," as used herein may refer to a targeted message or a message indiscriminately sent through a network. Such a message may be unsolicited and may be sent, for example, through an electronic messaging system, such as e-mail. Spam may contain an advertisement and the transmission of spam may be problematic if a large number of spam messages are transmitted through a network, taxing network bandwidth, for example.

Spam may also be included within a website. The presence of spam on a website may be problematic. For example, an Internet search engine may, for example, be part of an information integration system including a "crawler" or other process that may "crawl" the Internet in some manner to locate web documents, such as websites. Upon locating a web document, such a crawler may store the document's URL, and possibly follow hyperlinks associated with the web document, for example to locate other web documents. In the event that a website has been set up with little or no useful information to a user, but contains certain words or phrases to achieve a relatively high search engine ranking, and therefore increase the possibility of receiving referrals from Internet search engines, such a website may not, in fact, be relevant to a search query. Instead, such a website may be considered a spam website.

"Image spam," as used herein may refer to an image in which text spam is stored. For example, a spam text message may be stored as an image. Image spam may be transmitted through an electronic messaging system, such as e-mail or an instant messaging application, for example. Alternatively, such image spam may be stored on a website such that upon accessing such a website with an Internet browser, for example, such image spam would be displayed in a window of the browser. Image spam may include various types of noise that may make it difficult to determine the text of an image by directly performing optical character recognition.

Types of noise that have been used in image spam include salt-and-pepper noise, line noise, and polygonal noise. "Salt and pepper" noise may refer to colored pixels, such black and white pixels, scattered across an image, for example. "Line noise" may refer to lines extending across an image that may be formed of pixels of the same, or a similar color, and which differ in color from the background, such that such lines are often both visible and distracting. "Polygonal noise" may refer to colored objects formed of adjacent pixels having substantially the same color within an image. Such colored objects may be located around text characters displayed on an image. Polygonal noise may comprise a contiguous block of pixels of substantially the same color within an image. Such polygonal noise is sometimes located adjacent to, or surrounding, text characters in an image. Of salt and pepper noise, line noise, and polygonal noise, polygonal noise may be the most difficult class of noise to process.

FIGS. 1-4 illustrate four spam images 100, 200, 300, and 400, respectively, containing identical text messages. Such images may be formed of pixels. Here, such pixels may be arranged in a 2-dimensional grid, where each pixel represents a basic shape, such as a dot, square, or rectangle, for example. An intensity of each pixel may be variable. In a colored image system, each pixel may be formed of a combination of basic colors, such as red, green, and blue.

Spam images 100, 200, 300, and 400 shown in FIGS. 1-4 have been corrupted by polygonal noise. A determination as to whether an image contains spam may be based upon text used within the image itself. However, such a determination may be complicated by an addition of polygonal noise. For example, polygonal noise is sometimes added by spammers because the presence of different contiguous blocks of pixels in areas surrounding or near text may make optical character recognition unreliable in current systems. An optical character recognition (OCR) system may analyze an image to determine areas of relatively high contrast in an image, which may represent edges of text characters. However, if an image contains different colored polygonal noise objects, there may be many areas of high contrast which are unrelated to edges of text characters. Polygonal noise blocks may also reduce contrast between text characters and an image background—there may be enough contrast for human beings to distinguish text from background, but the contrast might be so low as to confuse OCR systems.

In the examples shown in FIGS. 1-4, images 100, 200, 300, and 400 are shown that include various colored objects surrounding colored text. As discussed above, some currently used methods may have difficulty determining whether such images comprise spam. Each of images 100, 200, 300, and 400 contain the same text message surrounded by various polygonal noises. The first paragraph of a text message in images 100, 200, 300, and 400 is the following:

Our picks bring our readers BIG GAINS! Why? Because we present well-researched, quality companies backed by promotions which have the ears of investors around the globe. When you have GREAT PRODUCT and UNRIVALED PR you get SUPER GAINS! This one is just what your portfolio needs:

. . .

If such text could be reliably determined from such images 100, 200, 300, and 400, a determination as to whether any of such images contain spam may be made. However, as discussed above, such current systems may not have the ability to reliably determine such text from an image containing polygonal noise.

In FIG. 1, for example, there are several different colored polygons in image 100, each of which may constitute noise. Such colored polygons are labeled with references 105, 110, 115, 120, 125, 130, 135, 140, 145, 150, 155, 160, and 165. For example, the third row of text in image 100, i.e., "companies backed by promotions which have the" is surrounded at different locations by colored polygons 105,110, 120, and 165.

Figure 2:
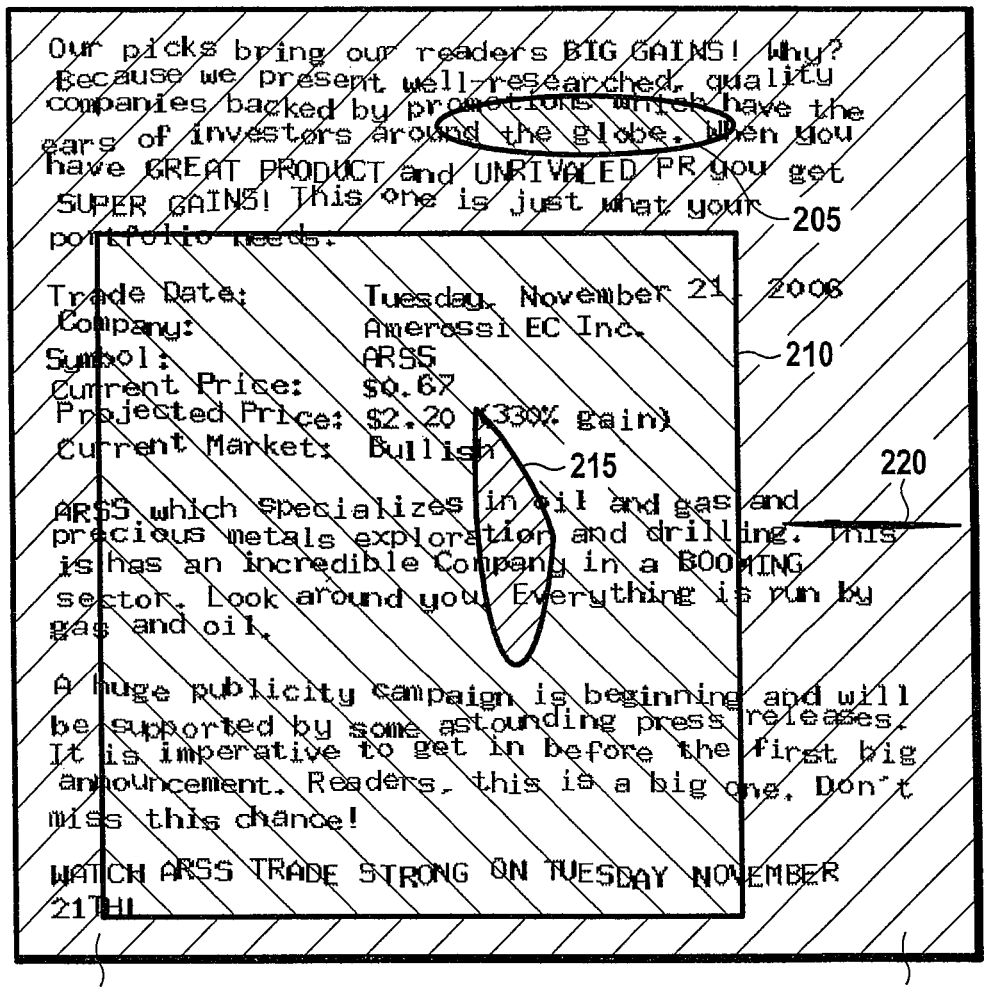
Figure 3:
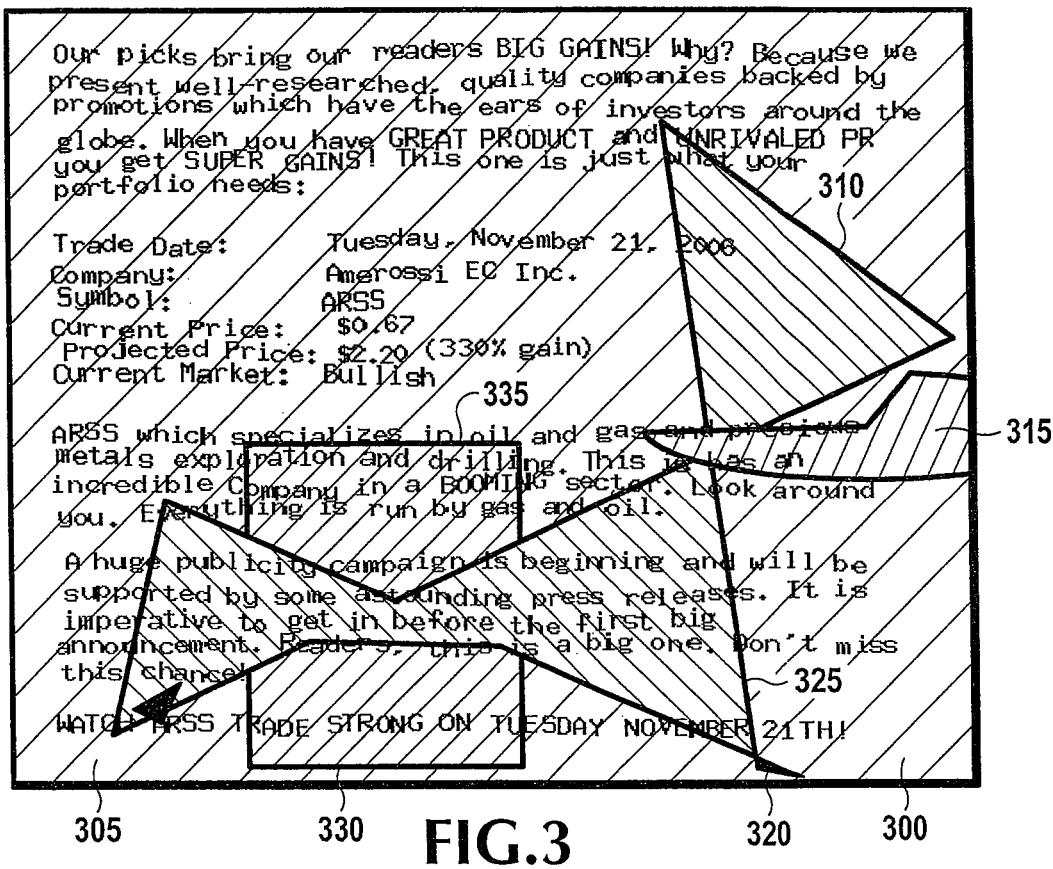
Figure 4:
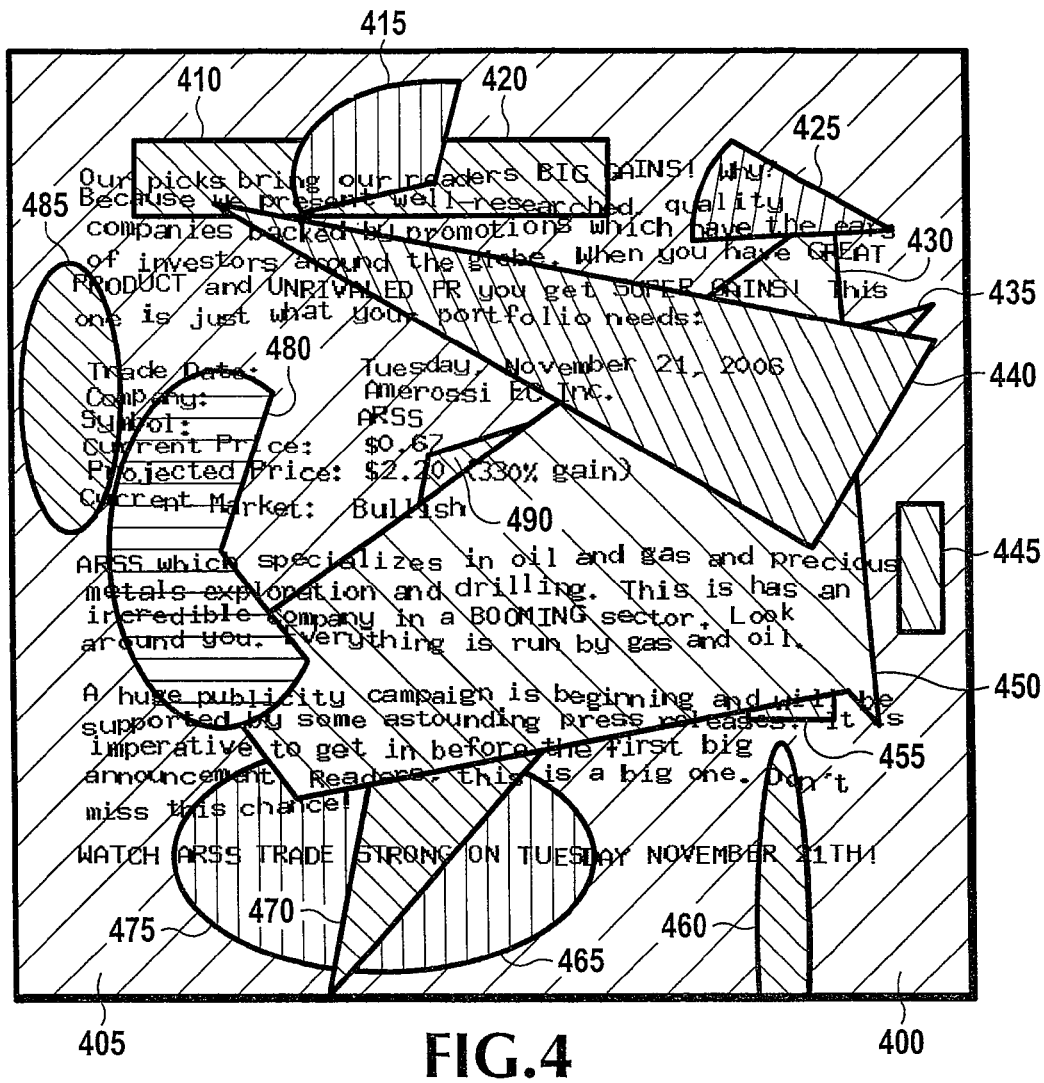

FIG. 2 illustrates different colored polygons in image 200, each of which may constitute noise. In FIG. 2, such colored polygons are labeled with references 205, 210, 215, 220, and 225. FIG. 3 illustrates different colored polygons in image 300 labeled with references 305, 310, 315, 320, 325, 330, and 335. FIG. 4 illustrates different colored polygons in image 400 labeled with references 405, 410, 415, 420, 425, 430, 435, 440, 445, 450, 455, 460, 465, 470, 475, 480, 485, and 490.

Each of such colored polygons surround various text characters of the text message shown in images 100, 200, 300, and 400. As shown, each of images 100, 200, 300, and 400 have various different shaped colored polygons of different sizes. Such colored polygons surround various text characters of the text message shown in images 100, 200, 300, and 400.

In order to determine whether an image contains spam, such an image may be subjected image processing prior to making a spam determination. A reason why optical character recognition is difficult in current systems is because image spam often contains various polygons of different colors. However, such images would be easier to categorize as spam if they contains fewer colors. To this end, an image may be converted or transformed from a multi-colored image, e.g., an image containing various different pixel intensities, to an image containing fewer colors such as binary image, e.g., an image containing only two pixel colors such as black and white. It should be appreciated that such a binary image may contain a different color scheme than black and white, such as yellow and blue, for example. A black and white color scheme is discussed herein for illustrative purposes.

In a binary image, each pixel is either a first color or a second color. In the example of a black and white image, a particular pixel in the image would be either black or white. To simplify text determination for an image, it may be advantageous to convert pixels representative of text in the image to a first color, such as black, and pixels representative of background or a colored polygon to a second color, such as white. Alternatively, pixels representative of text may be converted to white, and pixels representative of background may be converted to black in some implementations.

Figure 5:
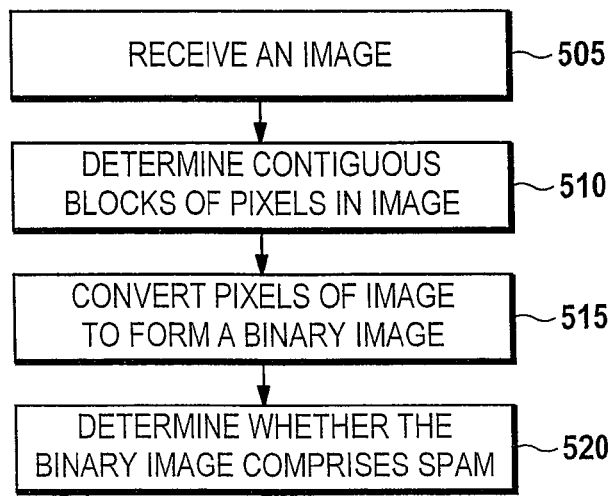
FIG. 5 illustrates a method for determining whether an image comprises spam according to one implementation.

FIG. 5 illustrates a method 500 for determining whether an image comprises spam according to one implementation. First, at operation 505, an image is received. Such an image may be received from an electronic communication, such as an e-mail, or may be received by visiting a website with a browser, for example. Such an image may be analyzed to determine one or more contiguous groups or chunks of pixels within the image at operation 510.

Analysis of an image based on contiguous blocks of pixels may be based on certain observations of spam images. First, a spam image may contain noisy polygon shapes and each noisy polygon present in a spam image may comprise a contiguous block of pixels of substantially the same color. Second, textual characters present in spam images may also be formed of contiguous blocks containing pixels of the same color but the textual blocks themselves are much smaller in size compared to the polygons.

Each of the contiguous chunks of pixels may be comprised of pixels having a color value within a predetermined threshold difference of a second color value of one or more adjacent pixels. For example, in a color image, a pixel may be represented by a Red-Green-Blue ("RGB") value, and adjacent pixels having RGB values within a predetermined range of each other may be determined to form a contiguous chunk in an image. For example, an RGB value for a pixel may include three components—an intensity value for red, an intensity value for green, and an intensity value for blue. The scale for RGB values may be system dependent. In one implementation, each of the RGB values may be represented by an integer between 0 and 255 (e.g., $2^8$ different possible intensity values for each RGB component). In another implementation, each RGB value may be represented by a value between 0 and 65535 (e.g., $2^{16}$ different possible intensity values for each RGB component).

In a system where an integer between 0 and 255 is used to represent each RGB component, the color red may be represented with the RGB value (255,0,0), the color green may be presented with (0,255,0), and the color blue may be represented with (0,0,255). Other colors may be represented with different intensity values for each of the RGB components.

In determining whether adjacent pixels form a contiguous block of pixels, an analysis may be made as to whether such adjacent pixels have either the same RGB values or RGB values within a predetermined range. For example, if one pixel is represented by the RGB value (53,27,48), an adjacent pixel may be determined to form part of a contiguous block of pixels if such adjacent pixel has an RGB value within, for example, a value of 10 for each of the RGB components. Accordingly, if the adjacent pixel has a red value of between 43 and 63, a green value of between 17 and 37, and a blue value of between 38 and 58, such an adjacent pixel may be determined to form part of the contiguous block of pixels.

In addition to RGB value ranges, color distance between near-by pixels may also need be within a certain threshold in order to be considered part of a contiguous block of pixels in some implementations. "Color distance," as used herein, may refer to a way of characterizing differences in color between pixels. For example, one form of color distance between two pixels with color values (R1, G1, B1) and (R2, G2, B2) is |R1−R2|+|G1−G2|+|B1−B2|, where |x| denotes absolute value of x. This is merely one way, among many, of representing color distances and it should be appreciated that there are other ways to represent color distances.

Referring back to FIG. 1, image 100 may include different contiguous chunks. For example, each character of the text of image 100 may comprise its own contiguous chunk if such a character is formed of pixels having RGB values that are within a predetermined range of each other and if each character of the text is isolated from other textual characters of such an image. Moreover, shapes in a background of such an image may also form contiguous shapes. For example, there is an oval shaped colored polygon 110 located in the upper right-hand side of image 100 shown in FIG. 1.

It should also be appreciated that there may be contiguous shapes within line segments forming a text character. For example, although there is an oval shaped colored polygon 110 in the upper right-hand corner of image 100, there is text located over a portion of oval shaped colored polygon 110. Many pixels of oval shaped colored polygon 110 may form their own contiguous shape. For example, such pixels located outside of any line segments of text characters disposed in the area where the oval shaped colored polygon 110 may be considered a contiguous shape. Moreover, in the text word "you" on the fourth line of text in image 100, for example, pixels forming line segment of the "o" character form their own contiguous shape. Any pixels located entirely within line segments forming a text character may also be considered to be a contiguous shape. For example, pixels within line segments forming the "o" character form their own contiguous shape. Because such pixels are disposed entirely in between line segments forming such an "o" character, such pixels are may not be considered a part of the rest of the contiguous oval shaped colored polygon 110.

Referring back to FIG. 5, at operation 515, after all contiguous blocks of pixels for an image have been determined pixels within the one or more contiguous chunks of pixels are converted to a first color if a number of pixels within such a contiguous chunk of pixels is less than or equal to a first size threshold or greater than or equal to a second size threshold.

In this example, it may be assumed that a number of pixels forming a text character is greater than the first threshold and less than the second threshold. Such a first size threshold may be utilized to set relatively small blocks of pixels (which often correspond to noise) to the first color. Such a second size threshold may be utilized to also set relatively large blocks of pixels (which may correspond to the noisy polygons) to the first color. Therefore, relatively small contiguous blocks of pixels such as salt and pepper noise, or a contiguous block within line segments forming characters, such as pixels within line segments forming the character "o," for example are converted to the first color. Relatively large contiguous blocks of pixels may be determined to either represent an image background or polygon noise.

Any contiguous object formed of a number of pixels between the first and second size thresholds, on the other hand, may be converted to a second color. In one example, such a first color may be black and such a second color may be white. Such a method may result in the removal of polygonal noise from spam images thereby making them amenable to further processing by standard image spam filtering methods. Such first and second size thresholds may be determined prior to any image processing based on predetermined acceptable threshold values. Alternatively, an image may initially be processed to determine how a range for how many pixels would likely be included in such an image.

One way to determine size thresholds adaptively is to order ascendingly the sizes of all the contiguous blocks in an image. A first threshold may subsequently be selected that corresponds to the size of an object at, for example, the 20th percentile and the second threshold may be selected that corresponds to the size of and object at, for example, the 80th percentile.

In one implementation, sizes of contiguous blocks may be plotted in a chart—a first threshold may be selected based on a location in the plot where there is a huge jump in size difference at the beginning and the second threshold as the size where there is a huge jump in the size difference at the end of the plot.

Alternatively, a clustering technique may be utilized to cluster pixels into three different groups (containing small blocks, medium blocks and large blocks) based on size. A first threshold may correspond to a size of the largest block in the cluster containing the small-sized blocks and a second threshold may correspond to a size of the smallest block in the cluster containing the large-sized blocks.

Referring to FIG. 5, at operation 515, a binary image may be generated that displays text characters in a white color against black colored background pixels. Finally, at operation 520, a determination is made regarding whether the image contains spam, as discussed below.

FIGS. 6-9 illustrate examples of binary images 600, 700, 800, and 900 formed after implementing a conversion based on contiguous chunks according to one implementation, as discussed above with respect to FIG. 5. FIGS. 6-9 represent binary images that may be generated after performing a conversion on FIGS. 1-4, respectively. Image 600 of FIG. 6 may be generated after performing a method as described in FIG. 5 on image 100 of FIG. 1. Similarly, image 700 of FIG. 7 may be generated after performing a method as described in FIG. 5 on image 200 of FIG. 2. Image 800 of FIG. 8 may be generated after performing a method as described in FIG. 5 on image 300 of FIG. 3. Image 900 of FIG. 9 may be generated after performing a method as described in FIG. 5 on image 400 of FIG. 4.

As shown, in images 600, 700, 800, and 900, background pixels have been converted to a black color, where pixels of text characters have been converted to a white color. As shown, such resultant binary images of FIGS. 6-9 may contain text characters that are more discernable than those of FIGS. 1-4.

In one implementation, text characters in a converted binary image, such as images 600, 700, 800, and 900, may be determined based upon optical character recognition, where text characters may be determined based upon analysis of pixels within such an image to determine whether any groups of pixels represent one or more text characters. After such text characters have been determined, a spam filter may determine whether such resultant text comprises spam. A spam filter may compare letters, characters, words, phrases, and locations, for example, against characteristics of known spam messages to determine whether converted text of an image constitutes spam.

In the event that, for example, a text message is determined to constitute spam, the original image from which the text was extracted may be sent to a spam database to update such a spam database. If text message of FIGS. 1-4 is determined to be spam, for example, images 100, 200, 300, and 400 may each be transmitted to a spam database. Accordingly, if the text in an image can be identified accurately, it may be helpful for identifying multiple images, such as those shown in FIGS. 1-4, that all these fall under the same spam set. Such text identification may also be utilized for labeling such images as spam by using text-based filtering methods including comparing such images against a database of known text spam messages.

In one implementation, it may not be necessary to perform optical character recognition on an image. Instead, a binary image may be analyzed to determine an image signature. Such an image signature may be determined based upon, for example, a histogram of the image, binary moments of the pixels in the image, or image hashing techniques such as locality sensitive hashing. In this example, such an image signature may be utilized to determine whether a binary image comprises spam.

Figure 10:
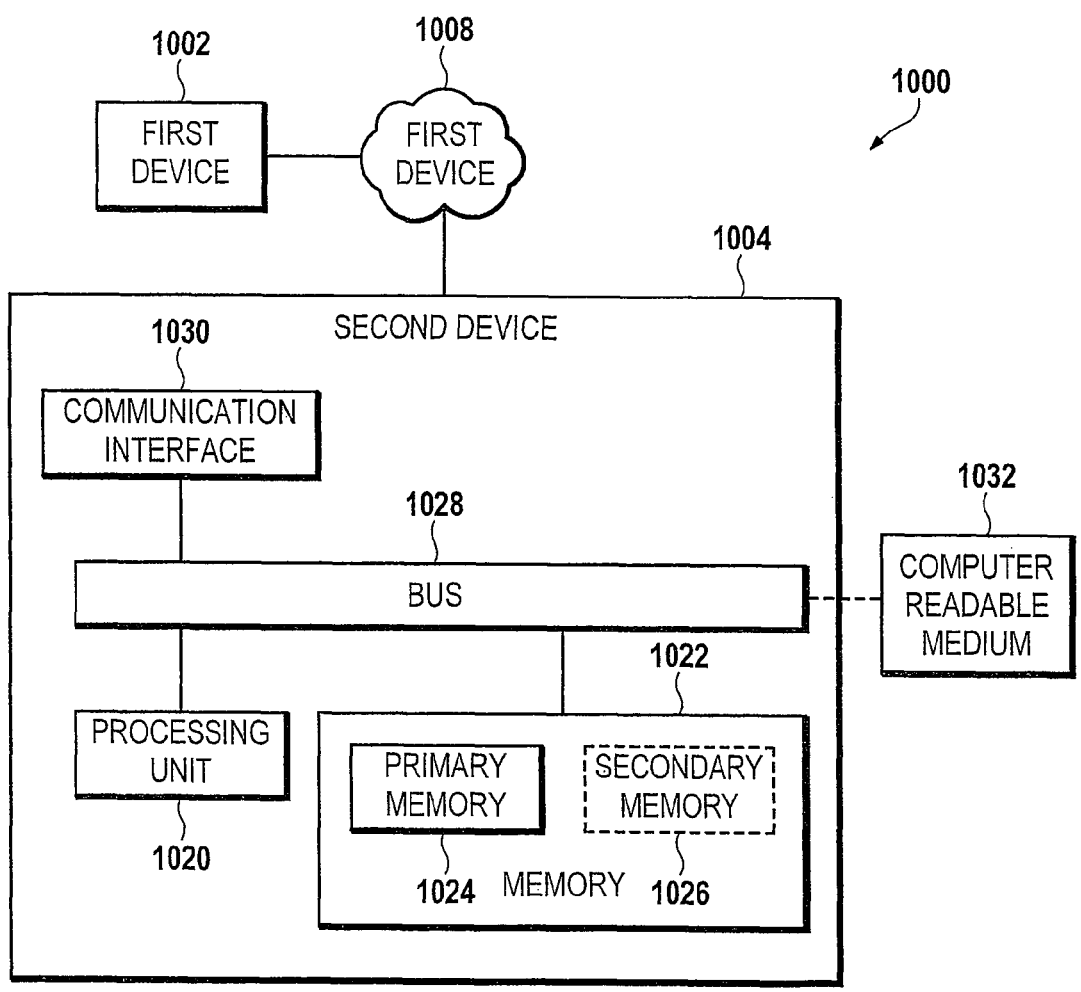
FIG. 10 is a schematic diagram illustrating a computing environment system that may include one or more devices configurable to detect image spam according to one implementation.

FIG. 10 is a schematic diagram illustrating a computing environment system 1000 that may include one or more devices configurable to receive an image and determine whether the image contains spam using one or more techniques illustrated above, for example, according to one implementation. System 1000 may include, for example, a first device 1002 and a second device 1004, which may be operatively coupled together through a network 1008.

First device 1002 and second device 1004, as shown in FIG. 10, may be representative of any device, appliance or machine that may be configurable to exchange data over network 1008. First device 1002 may be adapted to receive a user input from a program developer, for example. By way of example but not limitation, either of first device 1002 or second device 1004 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 1008, as shown in FIG. 10, is representative of one or more communication links, processes, and/or resources configurable to support the exchange of data between first device 1002 and second device 1004. By way of example but not limitation, network 1008 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

It is recognized that all or part of the various devices and networks shown in system 1000, and the processes and methods as further described herein, may be implemented using or otherwise include hardware, firmware, software, or any combination thereof.

Thus, by way of example but not limitation, second device 1004 may include at least one processing unit 1020 that is operatively coupled to a memory 1022 through a bus 1028.

Processing unit 1020 is representative of one or more circuits configurable to perform at least a portion of a data computing procedure or process. By way of example but not limitation, processing unit 1020 may include one or more processors, controllers, microprocessors, microcontrollers, application specific integrated circuits, digital signal processors, programmable logic devices, field programmable gate arrays, and the like, or any combination thereof.

Memory 1022 is representative of any data storage mechanism. Memory 1022 may include, for example, a primary memory 1024 and/or a secondary memory 1026. Primary memory 1024 may include, for example, a random access memory, read only memory, etc. While illustrated in this example as being separate from processing unit 1020, it should be understood that all or part of primary memory 1024 may be provided within or otherwise co-located/coupled with processing unit 1020.

Secondary memory 1026 may include, for example, the same or similar type of memory as primary memory and/or one or more data storage devices or systems, such as, for example, a disk drive, an optical disc drive, a tape drive, a solid state memory drive, etc. In certain implementations, secondary memory 1026 may be operatively receptive of, or otherwise configurable to couple to, a computer-readable medium 1032. Computer-readable medium 1032 may include, for example, any medium that can carry and/or make accessible data, code and/or instructions for one or more of the devices in system 1000.

Second device 1004 may include, for example, a communication interface 1030 that provides for or otherwise supports the operative coupling of second device 1004 to at least network 1008. By way of example but not limitation, communication interface 1030 may include a network interface device or card, a modem, a router, a switch, a transceiver, and the like.

System 1000 may utilize second device 1004 to implement an application program to analyze an image to determine whether such an image contains spam.

A method and system, as discussed herein, may analyze an image to determine whether such an image contains spam. Such an image may contain many different colored pixels. Contiguous chunks of pixels of substantially the same color may be determined and then chunks of pixels below a first size threshold or above a second size threshold are converted to a first color, such as black, for example, as such pixels are determined to be part of a background or noise of an image. Contiguous chucks of pixels between the first and second size thresholds may be converted to a second color, such as white. Accordingly, an image with text and different colors throughout the image may be converted to a binary image, such as a black and white image. Although the discussion above is directed to conversation of pixels of an image to one of two colors, it should be appreciated that in some implementations, there may be more than two colors to which a pixel may be converted.

After an image has been converted, a determination is made regarding whether text characters in the image constitute spam. In one implementation, optical character recognition is performed on image text characters to determine text corresponding to the image and then such text may be analyzed by a spam filter. In one other implementation, an image signature for a converted image is determined and then compared against image signatures for known spam images. Such a process of converting an original image into a binary image may result in reliable spam detection.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method, comprising:
   transforming an input image comprising pixels having three or more different colors into an output image comprising pixels having two colors, the transforming comprising:
   identifying two or more contiguous chunks of pixels in the input image at least partially in response to determining that a difference in corresponding color values between adjacent pixels in individual ones of the two or more contiguous chunks of pixels is below a threshold pixel difference value;
   converting the pixels within the individual ones of the two or more contiguous chunks of the pixels of the input image to:
   a first color at least partially in response to determining that a number of the pixels within individual ones of the two or more contiguous chunks of pixels is less than or equal to a first size threshold or greater than or equal to a second size threshold, or
   a second color at least partially in response to determining that a number of pixels within the individual ones of two or more contiguous chunks of pixels is between the first and second size thresholds; and
   determining whether the output image comprises spam.

2. The method of claim 1, wherein the color value comprises an RGB color value.

3. The method of claim 1, wherein the determining whether the output image comprises spam is based, at least in part, on a determined image signature for the output image, the image signature being determined based on characteristics of the pixels of the output image.

4. The method of claim 1, further comprising converting the pixels having the second color into corresponding text.

5. The method of claim 4, wherein the determining whether the output image comprises spam is based, at least in part, on characteristics of the corresponding text.

6. The method of claim 1, further comprising determining a first size threshold value and a second size threshold value for the one or more contiguous chunks of pixels.

7. The method of claim 1, further comprising receiving the input image from an e-mail communication.

8. The method of claim 1, further comprising receiving the input image from a web site.

9. The method of claim 1, further comprising analyzing the input image to determine the two or more contiguous chunks of pixels within the input image, the individual ones of the two or more contiguous chunks of pixels being comprised of pixels having a color value within a predetermined difference of a second color value of one or more adjacent pixels.

10. An article comprising:
    a non-transitory storage medium comprising machine-readable instructions stored thereon which are executable by a computing platform to:
    transform an input image comprising pixels having three or more different colors into an output image comprising pixels having two colors, the transformation comprising:
    identification of two or more contiguous chunks of pixels in the input image at least partially in response to determining that a difference in corresponding color values between adjacent pixels in individual ones of the two or more contiguous chunks of pixels is;
    conversion of pixels within the individual ones of the two or more contiguous chunks of pixels of the input image to:
    a first color at least partially in response to determining that a number of pixels within individual ones of the two or more contiguous chunks of pixels is less than or equal to a first size threshold or greater than or equal to a second size threshold, or
    to a second color at least partially in response to determining that a number of pixels within the individual ones of two or more contiguous chunks of pixels is between the first and second size thresholds; and determine whether the output image comprises spam.

11. The article of claim 10, wherein the machine-readable instructions are further executable by the computing platform to determine whether the output image comprises spam based, at least in part, on a determined image signature for the output image, the image signature being determined based on characteristics of the pixels of the output image.

12. The article of claim 10, wherein the machine-readable instructions are further executable by the computing platform to convert the pixels having the second color into corresponding text.

13. The article of claim 12, wherein the machine-readable instructions are further executable by the computing platform to determine whether the output image comprises spam based, at least in part, on characteristics of the corresponding text.

14. The article of claim 10, wherein the machine-readable instructions are further executable by the computing platform to determine a first size threshold value and a second size threshold value for the individual ones of the two or more contiguous chunks of pixels.

15. The article of claim 10, wherein the machine-readable instructions are further executable by the computing platform to determine the two or more contiguous chunks of pixels within the input image, wherein the individual ones of the two or more contiguous chunks of pixels are comprised of pixels having a color value within a predetermined difference of a second color value of one or more adjacent pixels.

16. A system comprising:
a computing platform to:
transform an input image comprising pixels having three or more different colors into an output image comprising pixels having two colors, the transformation comprising:
identification of two or more contiguous chunks of pixels in the input image at least partially in response to determining that a difference in corresponding color values between adjacent pixels in individual ones of the two or more contiguous chunks of pixels is;
conversion of pixels within the one or more contiguous chunks of pixels of the input image to a first color at least partially in response to determining that a number of pixels within the individual ones of the two or more contiguous chunks of pixels is less than or equal to a first size threshold or greater than or equal to a second size threshold, or to a second color at least partially in response to determining that a number of pixels within individual ones of the two or more contiguous chunks of pixels is between the first and second size thresholds; and
determine whether the output image comprises spam.

17. The system of claim 16, wherein computing platform capable of determining whether the output image comprises spam is based, at least in part, on a determined image signature for the output image, the image signature being determined based on characteristics of the pixels of the output image.

18. The system of claim 16, wherein computing platform is capable of converting the pixels having the second color into corresponding text.

19. The system of claim 18, wherein computing platform is capable of determining whether the output image comprises spam based, at least in part, on characteristics of the corresponding text.

20. The method of claim 1, further comprising:
ordering the two or more contiguous chunks of pixels based, at least in part, on a number of the pixels forming individuals ones of the two or more contiguous chunks of pixels; and
selecting the first size threshold based at least in part on the ordering.

* * * * *